Figure 1:
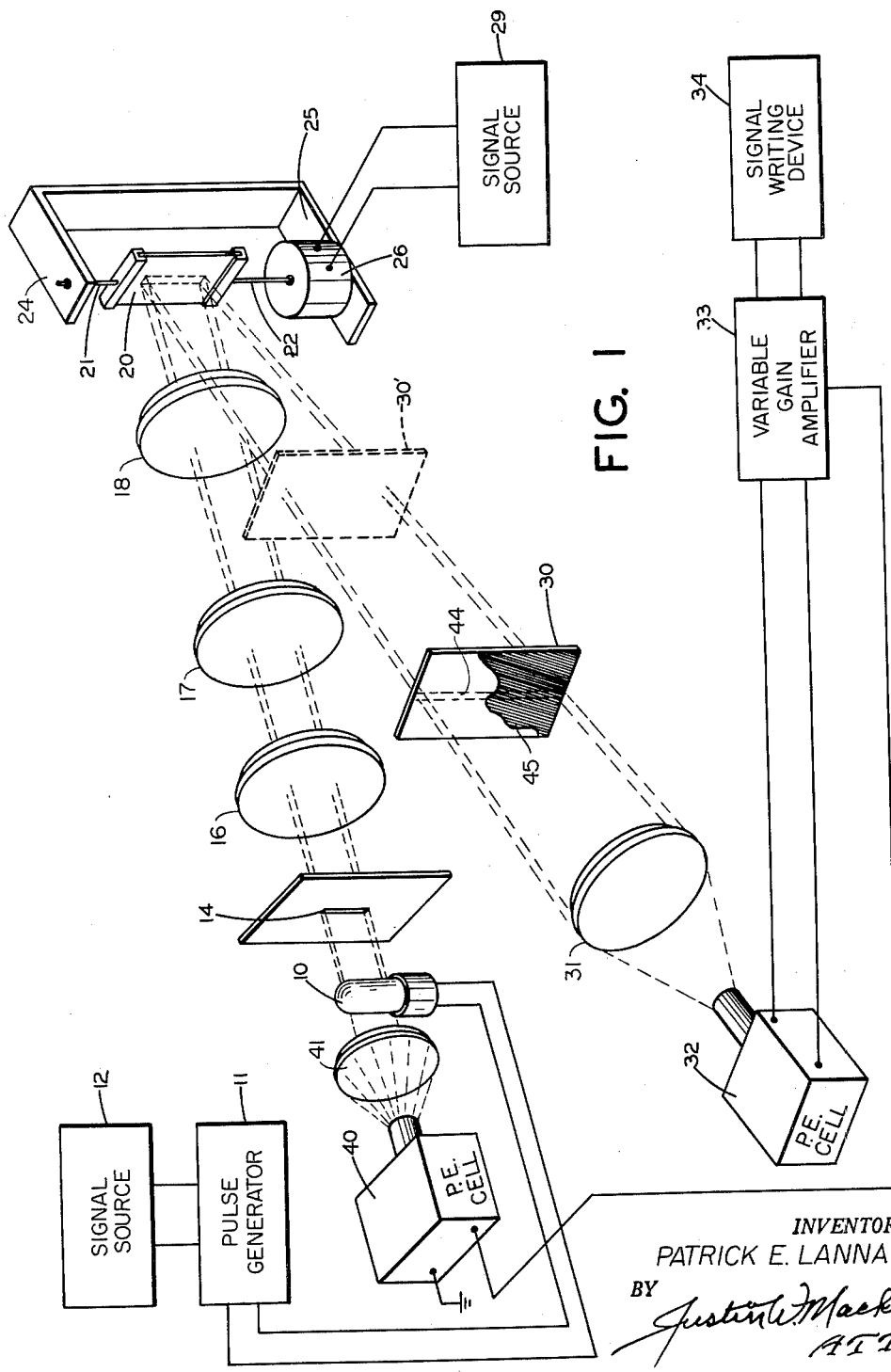

INVENTOR.
PATRICK E. LANNAN

United States Patent Office 3,068,361
Patented Dec. 11, 1962

3,068,361
FUNCTION GENERATOR
Patrick E. Lannan, Parma Heights, Ohio, assignor to Designers For Industry, Inc., Cleveland, Ohio, a corporation of Ohio
Filed May 9, 1958, Ser. No. 734,293
1 Claim. (Cl. 250—217)

This invention relates to a device for generating an electrical signal which varies over a given time interval in accordance with a predetermined mathematical law. The invention relates specifically to such a function generator or signal generator in which the electrical signal involved can be generated directly from a plot of the curve involved. The signal generated in accordance with the invention can also be multiplied or divided by various other electrical signals which are available.

In many electrical signal translating devices, it is necessary or desirable to generate an electrical signal which varies in accordance with a predetermined mathematical law. Very frequently, the mathematical equation for the law involved is available or can be derived. Also, in some cases, a plot of the function is available or can be empirically determined. It is very desirable to have a device which converts such a curve into an electrical signal which can be used in various electrical circuits where it is needed. For example, in computers of various types, it is frequently necessary to insert a correction of one kind or another, and to use the correcting factor as a multiplying factor upon a signal to be translated. The function generator of the invention is ideally suited for purposes of this kind. There are also many other applications.

Another example which might be mentioned is in a telephoto signal translating circuit. In such a circuit, an electrical signal is derived which varies in amplitude in accordance with the light reflecting or transmitting properties of the picture or negative to be transmitted. It is frequently necessary to change the relative amplitude values in various photographic processes. This is known as a "Gamma change" in the reproduced picture. It amounts to a logarithmic distortion of the various amplitude or shade values contained in the picture, and corresponds to a signal compression on a logarithmic basis, for example, in audio circuits. The device of the invention is particularly adapted for use in an arrangement of this kind.

It is an object of the invention to provide an improved function generator.

It is a further object of the invention to provide a function generator in which an electrical signal can be produced directly from a curve or graph representing the function to be generated.

It is still another object of the invention to provide a function generator of the general type under consideration here in which the function generated can also be multiplied with another signal to produce an electrical signal which varies with the product of the two.

In accordance with the invention, a device for generating an electrical signal which varies over a given time interval in accordance with a predetermined mathematical law comprises a light transmitting system and a light mask in the system having a pattern of different light transmitting properties which vary in a predetermined manner in accordance with the mathematical law involved. The device of the invention also includes means for successively scanning the above-mentioned portions of the mask in a timed sequence determined by the mathematical law involved with the light transmitted by the system over a given time interval to vary the light transmitted over this time interval in accordance with the pattern contained in the mask. The device comprises an additional means, responsive to the modulated light so obtained, for deriving an electrical signal which varies over the given time interval in accordance with the desired mathematical law.

In accordance with a further embodiment of the invention, the device also comprises an additional means for varying the light transmitted by the system over the given time interval in a predetermined manner, also dependent upon the mathetical law which defines the ultimate signal to be generated by the system. In this last-named case, the two signals involved are effectively multiplied and the output signal obtainable from the system is thus the product of the function generated as a result of a particular mask being inserted in the system and another function which is utilized to vary the light in the system.

For a better understanding of the invention, together with other and further objects thereof, reference is had to the following description taken in connection with the accompanying drawing and its scope will be pointed out in the appended claim.

Figure 2:
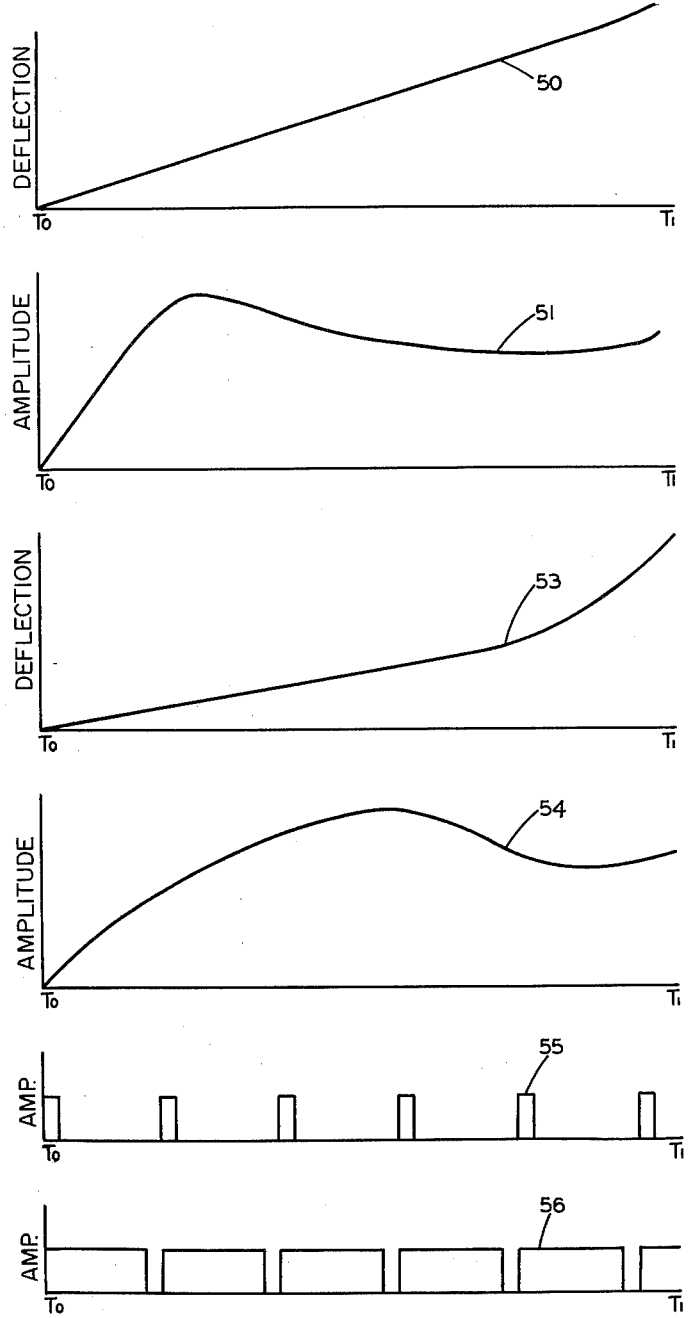

In the drawings, FIG. 1 represents a device in accordance with the invention for generating an electrical signal which varies over a time interval in accordance with a predetermined mathematical law; and FIG. 2 comprises curves utilized in explaining the operation of the device of FIG. 1.

Referring now more particularly to FIG. 1 of the drawing, the device illustrated there is for generating an electrical signal which varies over a given time interval in accordance with a predetermined mathematical law. The device includes a light source 10, which is illustrated in a conventional manner, but which preferably is a light of the neon, mercury, or zeon type.

In order that the amount of light from the source 10 can be quite precisely controlled, the electrical input thereto is preferably in the form of a series of square wave electrical pulses, the pulse duration of which can be varied to control the amount of light emitted by the light 10. Thus, the arrangement of FIG. 1 includes a pulse generator 11 and a signal source 12 which is effective, in a manner well understood by those skilled in the art, to vary the pulse duration of the pulse from generator 11.

A light slit 14 is included in the system for providing a ribbon of light to be used in a manner to be hereinafter described. Thus, a series of lenses 16, 17 and 18 are effective to columinate the light from the source 10 and to focus an image of the slit 14 on a mirror 20 of a galvanometer.

The galvanometer containing the mirror 20 is schematically represented in FIG. 1, and comprises support wires 21 and 22 for the mirror 20, connected between relatively fixed elements indicated by the reference numerals 24 and 25. The galvanometer includes an electrical coil within a housing 26 supported on the wire 22, which, as stated above, are included in the support for mirror 20. It will be understood that the coil in the housing 26 is included between the poles (not shown) of a strong magnet, in a manner which is well understood by those skilled in the art, and that the mirror 20 is thus adapted to be turned on the wires 21 and 22 in a torsional manner by the action of a current through the coil in the housing 26.

A signal source 29 is provided for supplying current to the coil in the housing 26 in order to deflect the mirror 20. In one embodiment of the invention, this signal source may cause a linear deflection of the mirror 20 to provide a linear scanning action by the light slit which is focused on the mirror in the manner described above. In various other embodiments of the invention, a signal, which is already available and which is to be used as a multiplier on the output signal of the FIG. 1 arrangement can be utilized as the signal source 29.

A light mask 30 having a pattern of different light translating properties which varies in a predetermined manner, in accordance with the mathematical law of the signal to be generated by the FIG. 1 device, is included in the system. The arrangement is such that the portions of the mask 30 comprising the pattern under consideration are successively scanned, in a timed sequence determined by the signal to be generated with the light from mirror 20 over a given time interval. The timed sequence of the scanning depends upon the deflecting signal which is applied to the coil 26. This has the effect of causing the light translated by the system to vary over the time interval under consideration in accordance with the pattern on mask 30. Light transmitted through the mask 30 is thereafter transmitted through a lens 31 to a photocell 32. Photocell 32 is effective to provide an electrical signal which varies in amplitude in accordance with the amount of light supplied to it through the lens 31.

A variable gain amplifier 33 is provided for amplifying the signal provided by photocell 32, and the signal is thereafter supplied to a signal utilizing device 34. The signal utilizing device, as stated above, may be a portion of an electrical computer, a gamma control device in a telephoto signal translating system, etc.

Since undesired variations of the light from source 10 would also cause variations in the output signal from photoelectrical cell 32, it may be desirable under some circumstances to provide an arrangement for compensating for such variations. Thus, in the FIG. 1 arrangement, if the signal scource 12 and the pulse generator 11 are not expected to introduce a variable signal into the light system for translation to the photocell 32, an arrangement can be provided for effectively compensating the signal output of photoelectric cell 32 for any undesired variations of the intensity of the light from the source 10. Specifically, another photoelectric cell 40 can be provided and adapted to receive light from the source 10 through a lens 41. An output signal is thus provided by photocell 40, which varies in accordance with the intensity variations of the light from the source 10. This output signal from photocell 40 can be used inversely to control the gain of variable gain amplifier 33 in a manner which compensates the output of the amplifier 33 for any variations in the intensity of light source 10.

In considering the operation of the device of FIG. 1, it will first be assumed that pulse generator 11 and signal source 12 are effective to supply a constant current to the light 10 so that there is no variation in the intensity of the light from the source 10. Under these assumed conditions, the lens system 16, 17 and 18 are, as stated above, effective to focus a vertical image of the slit 14 on the mirror 20. A deflection of the mirror 20 will cause this light slit effectively to scan the surface of the mask 30. Specifically, the vertical light beam from the slit will move over the mask 30, for example, from left to right. One position of the light from the slit is shown by the dotted lines 44. Under the conditions assumed, the image of the light represented by the dotted lines 44 is focused on photocell 32 and generates an output signal which is supplied to the signal utilizing device 34. This output signal has an intensity or amplitude depending upon the amount of light which the mask 30 allows to go through the system to the photocell 32.

If now it is assumed that a signal is supplied from signal source 29, which is effective to cause the light slit to travel across the face of the mask 30 from left to right at a uniform speed, or, in other words, to provide a linear scanning of mask 30, it will be seen that the amount of light supplied to photocell 32, and, therefore, the output signal to signal utilizing device 34, will vary over the scanning period in accordance with the varying amounts of light which are allowed to pass through the system by the mask 30. The mask 30 is preferably entirely transparent over one portion and entirely opaque over another portion. Thus, for example, the line 45 on the mask 30 may represent the plot of a mathematical function which is to be generated, or it may be the plot of an empirically determined curve, or a curve which is simply drawn in order to provide a specific function for supply to signal utilizing device 34. In any such case, it will be understood that the words "varying in accordance with a predetermined mathematical law" are intended to apply to all curves of the type described in connection with the mask 30. Preferably, all portions of the mask 30 below the line 45 are entirely opaque, and all portions above the line 45 are entirely transparent. Under the conditions assumed, with the linear scanning provided by the mirror 20, it will be seen that the electrical signals supplied to signal utilizing device 34 vary exactly in accordance with the amplitude variations in the curve 45 of the mask 30. It will also be understood that any other curve for which a corresponding output signal is desired can be drawn or placed on the mask 30. The system as so far described can thus be used to generate any function which can be drawn or plotted simply by placement of the drawing or plot at the point of mask 30 in the FIG. 1 system.

If the light source 10 should have undesirable intensity variations, the photocell 40 and the variable gain amplifier 33 can be used to provide a compensation. Thus, if the light from source 10 increases, the output from the photocell 40 is effective to cut down the gain of amplifier 33; while if the output from light source 10 decreases, the output from photocell 40 is effective to increase the gain of amplifier 33, all to the end that a signal is supplied to the utilizing device 34 which does not vary in accordance with intensity variations of light source 10.

The device of the invention has other uses in addition to the one which is described. Thus, something other than a linear scanning signal may be supplied to the source 29. In this case, of course, the light to photocell 32 is made to vary not only with the curve drawn on the mask 30 but also in accordance with the signal which is provided by the signal source 29. Specifically, the light input to photocell 32 under these conditions depends upon the product of the function generated by function generator 30 and the signal or function supplied by signal source 29. The arrangement of FIG. 1 can thus become a signal multiplier in which the function drawn on mask 30 is caused to be multiplied by the function supplied by signal source 29.

It will be readily apparent, of course, to those skilled in the art that the signal source 29 can itself be derived from a function generator of the type illustrated in FIG. 1. Thus, the signal source 29 may itself contain a mask of the type illustrated by the numeral 30, and under such conditions, the FIG. 1 arrangement is effective to provide a multiplying of the two signals involved for use by the signal utilizing device 34.

It will be apparent, of course, that in place of multiplying one signal by another, the device can be effective to divide one signal by another if one of the masks is provided with the reciprocal of the signal which is to be used as the divisor.

Furthermore, it will be apparent that if another mask is introduced into the light path, as designated by the numeral 30$^1$ in the drawing and shown in dotted lines, the function generated by signal utilizing device 34 depends not only upon the curve which has been drawn on mask 30 but also depends upon any curve which may be present on the mask 30$^1$. Assuming that linear scanning is provided by the source 29, the system therefore again becomes a signal multiplier in which the function represented by the curve on mask 30 is effectively multiplied by any function represented on the mask 30$^1$, and a signal which varies in accordance with this product is thus effectively present at the output circuit of variable gain amplifier 33.

It will be understood that any number of masks corresponding to the mask 30 can be placed in the system, and that the output signal of amplifier 33 will thus depend upon the product of the signals represented on all of the masks involved.

There is still an additional way in which the simple function generator of FIG. 1 can be caused to act also as a function multiplier. Consider, for example, the arrangement of FIG. 1 in the case where all light from the light source 10 to the photocell 40 is effectively blocked, thus causing the variable gain feature of amplifier 33 to be ineffective. Variations in the intensity of the light source 10 under these conditions will cause the output of photocell 32 to depend not only upon the amount of light which mask 30 permits to pass but also upon the variations in the light intensity of lamp 10. This again provides a multiplying action insofar as the output signal from the amplifier 33 is concerned. If now a signal is to be multiplied with that generated because of mask 30, the pulse generator 11 will supply pulses to light source 10 which vary in duration in accordance with the signal from source 12, and thus effectively modulate the light output of source 10 in accordance with the amplitude of the signal from source 12. This, as stated above, has the effect of causing the signal of source 12 effectively to be multiplied by the signal generated as a result of mask 30 at the input circuit to utilizing device 34.

Reference is made to FIG. 2 for a further description of the action of the FIG. 1 arrangement. Thus, in FIG. 2 the curve 50 is intended to illustrate the linear scanning signal which is provided by signal source 29 over a given time interval $T_0$ to $T_1$. From an inspection of the curve drawn on mask 30, it will be seen that, when none of the other elements provide a light intensity variation in the system, the amplitude of the input signal to signal utilizing device 34 will vary in accordance with the signal represented by the curve 51 over the time interval $T_0$ to $T_1$. If now it is assumed that the signal input to coil 26 from the source 29 does not vary linearly, but varies in accordance with the curve 53, it will be apparent from what has been said above that the signal input to signal utilizing device 34 will depend upon the product of the curves 51 and 53. Accordingly, the signal input to the utilizing device 34 will vary over the time interval $T_0$ to $T_1$ substantially in accordance with the curve 54.

In curve 55 there are shown relatively short duration pulses which can be applied to the light source 10, while curve 56 represents relatively long duration pulses which can be supplied by pulse generator 11 over the time interval $T_0$ to $T_1$. If it is assumed that the signal source 12 can modulate the duration of the pulses from pulse generator 11 over the time interval $T_0$—$T_1$, for example, in accordance with the function represented by the curve 53, the system, as explained above, again becomes a function multiplier, and, assuming that the gain control feature of amplifier 33 is ineffective, the signal input to utilizing device 34 then becomes as represented by the curve 54.

From what has been said above, it will be readily apparent that the signal generator of the invention can be used to generate an electrical signal corresponding to any desired function which can be plotted or drawn, and that this signal can be used in any electrical system desired. If the light transmitted by the system of FIG 1, for example, is obtained not from source 10 but from the scanning of a picture in a telephoto system, the curve of mask 30, assuming that the system is otherwise made to be linear in the manner described above, can be utilized to insert any desired amplitude variation in the reproduced picture. It can, for example, effectively provide a gamma control of any desired value.

It will be seen that the element 30 provides a light mask in the system which has a pattern of different light translating properties which vary in a predetermined manner in accordance with the mathematical law of the signal to be generated over a given time interval $T_0$ to $T_1$. The mirror 20 is included in a means for successively scanning portions, specifically vertical portions as represented by dotted lines 44, in a timed sequence determined by the mathematical law of the signal to be generated. This scanning is done with the light transmitted by the system over a given time interval to vary the light transmitted over this time interval in accordance with the pattern on the mask 30. As brought out above, where the arrangement is to be used simply as a function generator, the scanning of the portions of mask 30 by light from the mirror 20 is in timed sequence, and this timed sequence is in turn also determined by the mathematical law of the signal to be generated.

It will also be apparent that it is not necessary for the light mask of the system to comprise portions which are entirely opaque and others which are entirely transparent. It is only necessary that the amount of light transmitted by the scanning beam be made to vary in accordance with the signal to be generated. Thus, the curve 45 could be represented on the light mask, not by portions which are entirely opaque and portions which are entirely transparent, but by vertical portions scanned by the light slit, which individually have uniform density but which vary in density across the mask in accordance with the signal to be generated.

While there has been described what is at present considered to be the preferred embodiment of this invention, it will be obvious to those skilled in the art that various changes and modifications may be made therein without departing from the invention, and it is therefore aimed in the appended claim to cover all such changes and modifications as fall within the true spirit and scope of the invention.

Having thus described my invention, what I claim is:

A device for generating an electrical signal which varies over a given time interval in accordance with a predetermined mathematical law comprising: a light transmitting system including a stationary light source, a light mask in said system having a pattern of elongated portions of different light translating properties which vary in a predetermined manner in accordance with said mathematical law, means for deflecting light transmitted by said system over said mask for successively scanning said mask in a portion-by-portion fashion and in a predetermined time sequence with the light transmitted by said system over a given time interval to vary the light transmitted over said time interval in accordance with said pattern, means responsive to said modulated light for deriving an electrical signal which varies over a given time interval in accordance with said predetermined mathematical law, means for amplifying said electrical signal, and means for controlling the gain of said amplifying means inversely in accordance with the light variations of said source to compensate for undesired variations in the intensity of said light source.

References Cited in the file of this patent

UNITED STATES PATENTS

| | | |
|---|---|---|
| 2,098,326 | Wente | Nov. 9, 1937 |
| 2,410,550 | Pavda | Nov. 5, 1946 |
| 2,420,058 | Sweet | May 6, 1947 |
| 2,462,263 | Haynes | Feb. 22, 1949 |
| 2,497,042 | Doll | Feb. 7, 1950 |
| 2,839,149 | Piety | June 17, 1958 |